US007250071B2

(12) United States Patent
Katsuki et al.

(10) Patent No.: US 7,250,071 B2
(45) Date of Patent: Jul. 31, 2007

(54) METHOD OF MANUFACTURING AUSTENITIC STAINLESS STEEL HAVING LESS SUSCEPTIBILITY TO CRACKING DURING FORMING

(75) Inventors: Junichi Katsuki, Shin-Nanyo (JP); Teruyoshi Iida, Shin-Nanyo (JP); Takashi Yamauchi, Shin-Nanyo (JP); Satoshi Suzuki, Shin-Nanyo (JP); Naoto Hiramatsu, Shin-Nanyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 221 days.

(21) Appl. No.: 10/889,956

(22) Filed: Jul. 13, 2004

(65) Prior Publication Data

US 2004/0261915 A1 Dec. 30, 2004

Related U.S. Application Data

(62) Division of application No. 10/041,115, filed on Jan. 8, 2002, now Pat. No. 6,780,258.

(30) Foreign Application Priority Data

Jan. 9, 2001 (JP) ............................. 2001-001192

(51) Int. Cl.
*C21B 7/06* (2006.01)
*C21B 7/10* (2006.01)

(52) U.S. Cl. .......................... 75/537; 75/508; 75/531; 75/543

(58) Field of Classification Search ................. 75/508, 75/531, 537, 543
See application file for complete search history.

(56) References Cited

U.S. PATENT DOCUMENTS

| 3,816,100 | A | * | 6/1974 | Ramachandran et al. .. 75/10.17 |
| 5,089,224 | A | | 2/1992 | Bletton et al. |
| 5,314,549 | A | | 5/1994 | Misao et al. |
| 5,407,493 | A | | 4/1995 | Yamauchi et al. |
| 5,496,514 | A | | 3/1996 | Yamauchi et al. |
| 5,651,937 | A | | 7/1997 | Descaves |
| 6,123,784 | A | | 9/2000 | Havette |

FOREIGN PATENT DOCUMENTS

| JP | 6-158230 | * | 6/1994 |
| JP | 09-263905 A | | 10/1997 |
| JP | 06158230 | | 6/1999 |

* cited by examiner

*Primary Examiner*—Deborah Yee
(74) *Attorney, Agent, or Firm*—The Webb Law Firm

(57) ABSTRACT

A new austenitic stainless steel containing approximately 0.1-1.0 mass % of Si and not more than approximately 0.003 mass % of Al. Nonmetallic inclusions dispersed in a steel matrix are converted to $MnO$—$SiO_2$—$Al_2O_3$ containing not less than approximately 15 mass % of $SiO_2$ and not more than approximately 40 mass % of $Al_2O_3$. During steel making, molten steel is covered with basic slag and heavily deoxidized with a Si alloy whose Al content is controlled to not more than approximately 1.0 mass % in a vacuum or non-oxidizing atmosphere. The austenitic stainless steel sheet can be formed to an objective shape without the occurrence of cracking due to its decrease in susceptibility to cracking and its good formability.

3 Claims, 3 Drawing Sheets

A $MnO$-$Al_2O_3$ PHASE DIAGRAM

A MnO-Al₂O₃ PHASE DIAGRAM a MnO-SiO2-Al2O3 phase diagram

METHOD OF MANUFACTURING AUSTENITIC STAINLESS STEEL HAVING LESS SUSCEPTIBILITY TO CRACKING DURING FORMING

CROSS REFERENCE TO RELATED APPLICATIONS

This application is a divisional application of U.S. application Ser. No. 10/041,115, filed on Jan. 8, 2002 now U.S. Pat. No. 6,780,258.

BACKGROUND OF THE INVENTION

1. Field of the Invention

The present invention relates to an austenitic stainless steel that has good formability and is less susceptible to cracking during forming, and also relates to a method of manufacturing thereof.

2. Description of Related Art

Austenitic stainless steel has been applied to various uses in broader industrial fields, e.g. parts of motor vehicles and electronic parts, due to its excellent formability compared with other types. As development of usage, a demand for provision of cheaper material becomes stronger and stronger.

In order to meet with such the demand, the inventors have continued investigation on material design directed to soft austenitic stainless steel, which is scarcely work-hardened, while saving addition of expensive Ni content. As results of the investigation, the inventors proposed new austenitic stainless steel resistant to work-hardening and good of hot-workability, as disclosed in JP 9-263905 A1. The proposed austenitic stainless steel contains austenite formers such as Cu and Mn at proper levels, while hardening elements such as C and N contents are controlled to lower levels.

Parts or members for motor vehicles and electronic devices are designed to a small size or lightened in these days. The trend of small-sizing or lightening needs provision of a steel sheet, which is good of formability capable of forming to an objective shape with a heavy drawing ratio but thinner compared with a conventional steel sheet. Due to severe forming conditions, nonmetallic inclusions put significant influences on occurrence of cracking during forming. Typical inclusion, which promotes occurrence and development of cracking, is galaxite ($MnO-Al_2O_3$) in a high-Mn steel sheet.

FIG. 1 is a $MnO-Al_2O_3$ phase diagram (reported by Oelsen, W. G. Heynert, Arch. Eisenhüttenwes, 26(1955), p. 567). Galaxite, which is generated at 1720° C., is hard inclusion. Once galaxite is precipitated in a steel matrix at a steel-making or casting step, it is not deformed by hot-rolling or cold-rolling. Consequently, galaxite of several tens μm in size, which is equal to a size of galaxite generated at the steel-making or casting step, remains as such in a steel sheet. A steel sheet for use as a part of an electronic device or the like is of 0.1-0.5 mm in thickness. As decrease of thickness of a steel sheet, the size of galaxite is not neglected but accelerates initiation of cracking during forming. Even when cracking is suppressed, galaxite acts as a starting point to generate scratches on a surface of a product. If a surface of a product is damaged by scratches, the product cannot be offered to the market.

SUMMARY OF THE INVENTION

The present invention aims at provision of a cleaned austenitic stainless steel sheet good of formability by converting inclusions to soft precipitates without generation of hard galaxite.

The present invention proposes a new austenitic stainless steel less susceptible to cracking during forming, which has the composition consisting of C up to 0.04 mass %, 0.1-1 mass % Si, Mn up to 5.0 mass %, S up to 0.0060 mass %, Al up to 0.003 mass %, 5-9 mass % Ni, 15-20 mass % Cr, N up to 0.035 mass %, 1.0-5.0 mass % Cu and the balance being Fe except inevitable impurities. Nonmetallic $MnO-SiO_2-Al_2O_3$ inclusions, which contains not less than 15 mass % of $SiO_2$ and not more than 40 mass % of $Al_2O_3$, is dispersed as fine particles in a steel matrix.

The stainless steel is manufactured by covering molten steel with basic slag in a vacuum or non-oxidizing atmosphere and strongly deoxidizing the molten steel by addition of a Si alloy whose Al content is controlled less than 1.0 mass %.

DETAILED DESCRIPTION OF THE INVENTION

The inventors have searched and examined effects of deoxidizing and refining conditions on formability of an austenitic stainless steel sheet containing approximately 0-0.4 mass % C, approximately 0.1-1.0 mass % Si, approximately 0-5.0 mass % Mn, approximately 5-9 mass % Ni, approximately 15-20 mass % Cr, approximately 0-0.035 mass % N, approximately 0-0.0060 mass % S and approximately 1.0-5.0 mass % Cu. After the austenitic stainless steel was deoxidized and refined in various conditions, it was hot-rolled and cold-rolled to a thickness of approximately 0.3 mm.

Each steel sheet was subjected to a drawing test with a drawing ratio of 3. Occurrence of cracking was noted in a steel sheet, wherein there was galaxite ($MnO-Al_2O_3$) inclusion containing less than 15 mass % of $SiO_2$ and more than 40 mass % of $Al_2O_3$. The results prove that galaxite, which is scarcely deformed during hot-rolling or cold-rolling, acts as a starting point to generate cracks when the steel sheet is severely drawn.

Figure 1:
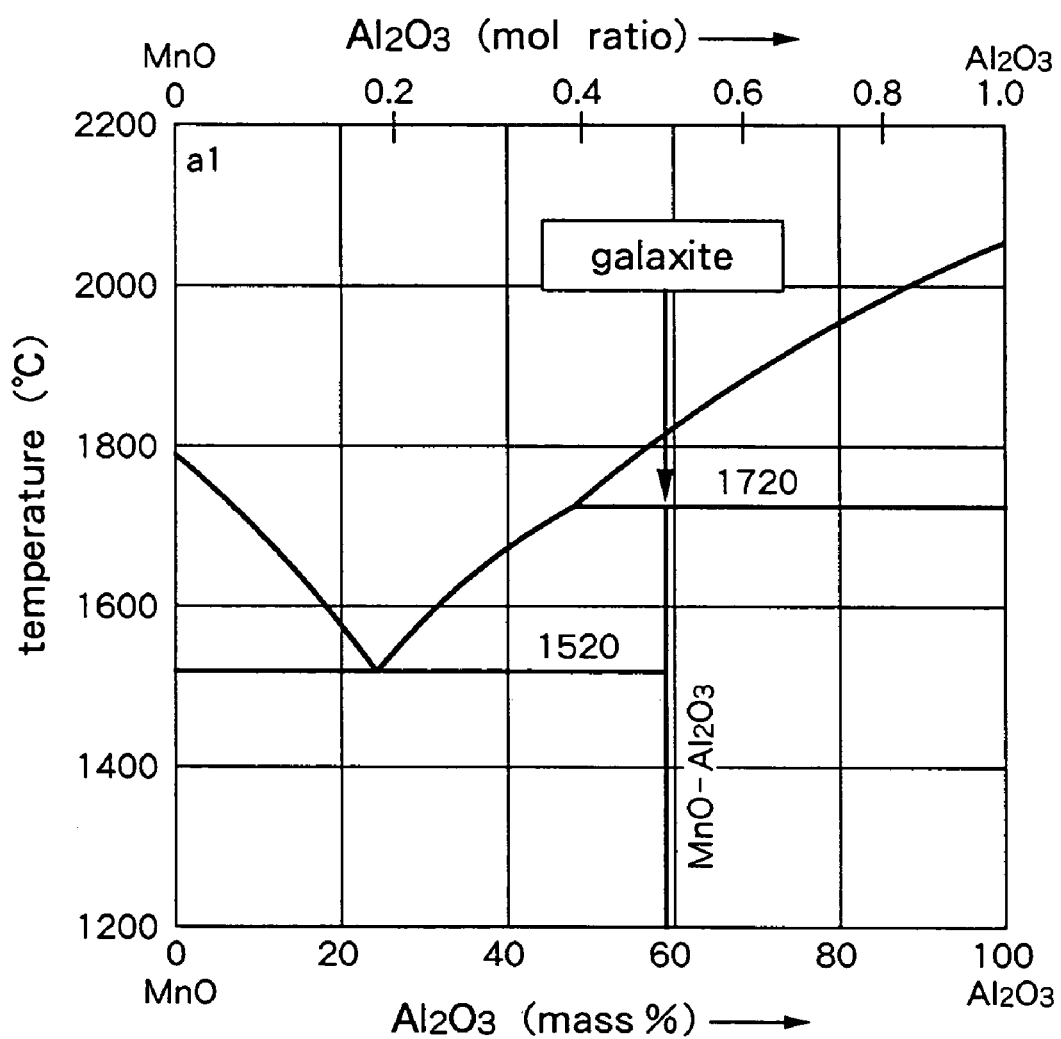
FIG. 1 is a $MnO-Al_2O_3$ phase diagram.
Figure 2:
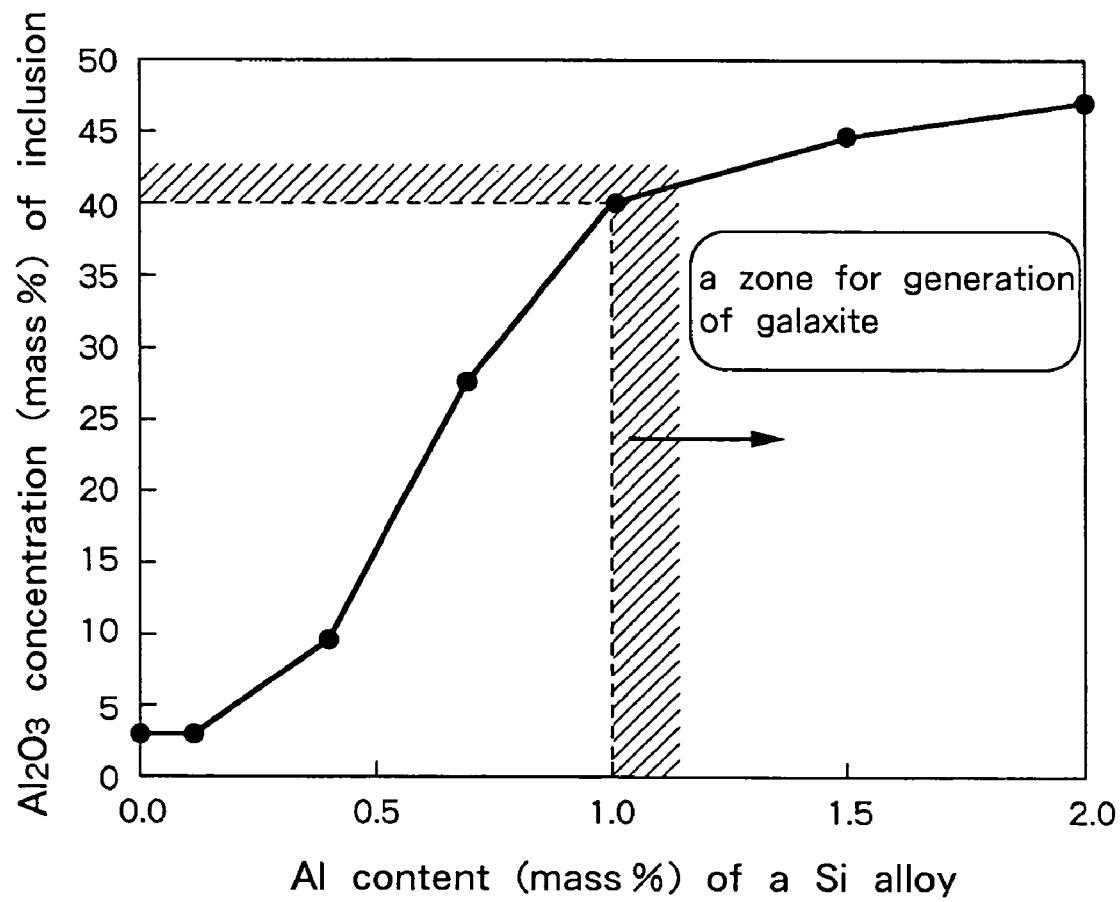
FIG. 2 is a graph for explanation of conditions for generation of galaxite.

The inventors have advanced various examinations in order to inhibit generation of galaxite inclusion, and discovered that Al content of a Si alloy as a deoxidizer put significant influences on $Al_2O_3$ concentration of galaxite inclusion. $Al_2O_3$ concentration of galaxite inclusion increased in proportional to Al content of the Si alloy, as shown in FIG. 2. When a Si alloy containing more than 1.0 mass % of Al as an impurity was used as a deoxidizer, $Al_2O_3$ concentration of galaxite inclusion exceeded 40 mass %.

Increase of $Al_2O_3$ concentration of galaxite inclusion in correspondence with Al content of a Si alloy is supposed as follows. $MnO-Cr_2O_3$ inclusion is present in molten steel before addition of a Si alloy as a deoxidizer. Although the $MnO-Cr_2O_3$ inclusion is reacted with Si and Al after addition of the Si alloy, the reaction with Al, which is more affinitive to oxygen, preferentially progresses. That is, the reaction of the MnO—$Cr_2O_3$ inclusion with the Si alloy is substantially predominated by Al content of the Si alloy. If the Si alloy contains Al as an impurity at a ratio more than 1.0 mass %, $Cr_2O_3$ in the MnO—$Cr_2O_3$ inclusion is replaced by $Al_2O_3$ according to the reaction formula (1), resulting in generation of galaxite (MnO—$Al_2O_3$).

$$(Cr_2O_3)_{incl.} + 2Al \rightarrow 2Cr + (Al_2O_3)_{incl.} \quad (1)$$

Of course, reactions of (2) to (4) also occur during deoxidizing, but a deoxidizing step shifts to a casting and solidifying step on the middle of any reaction. Any of the reaction interrupts in an industrial deoxidation-refining period, so that $SiO_2$ concentration in the inclusion is left at a low ratio less than 15 mass %, while MnO is not completely replaced by $Al_2O_3$.

$$2(Cr_2O_3)_{incl.} + 3Si \rightarrow 4Cr + 3(SiO_2)_{incl.} \quad (2)$$

$$3(MnO)_{incl.} + 2Al \rightarrow 3Mn + (Al_2O_3)_{incl.} \quad (3)$$

$$2(MnO)_{incl.} + Si \rightarrow 2Mn + (SiO_2)_{incl.} \quad (4)$$

where, X is an element dissolved in molten steel and $(XO_n)_{incl.}$ is a compound present in an inclusion.

If molten steel is deoxidized and refined without addition of a strong deoxidizer, in presence of acidic slag or uncovered with slag in the open air, deoxidization of the molten steel is insufficient. In this case, O concentration of the refined steel is still higher, and MnO—$Cr_2O_3$ inclusion is left as such in an un-oxidized state, so as to degrade cleanliness of the refined steel. Such the steel is sensitive to cracking caused by inclusions, since the MnO—$Cr_2O_3$ is also hard inclusion.

Figure 3:
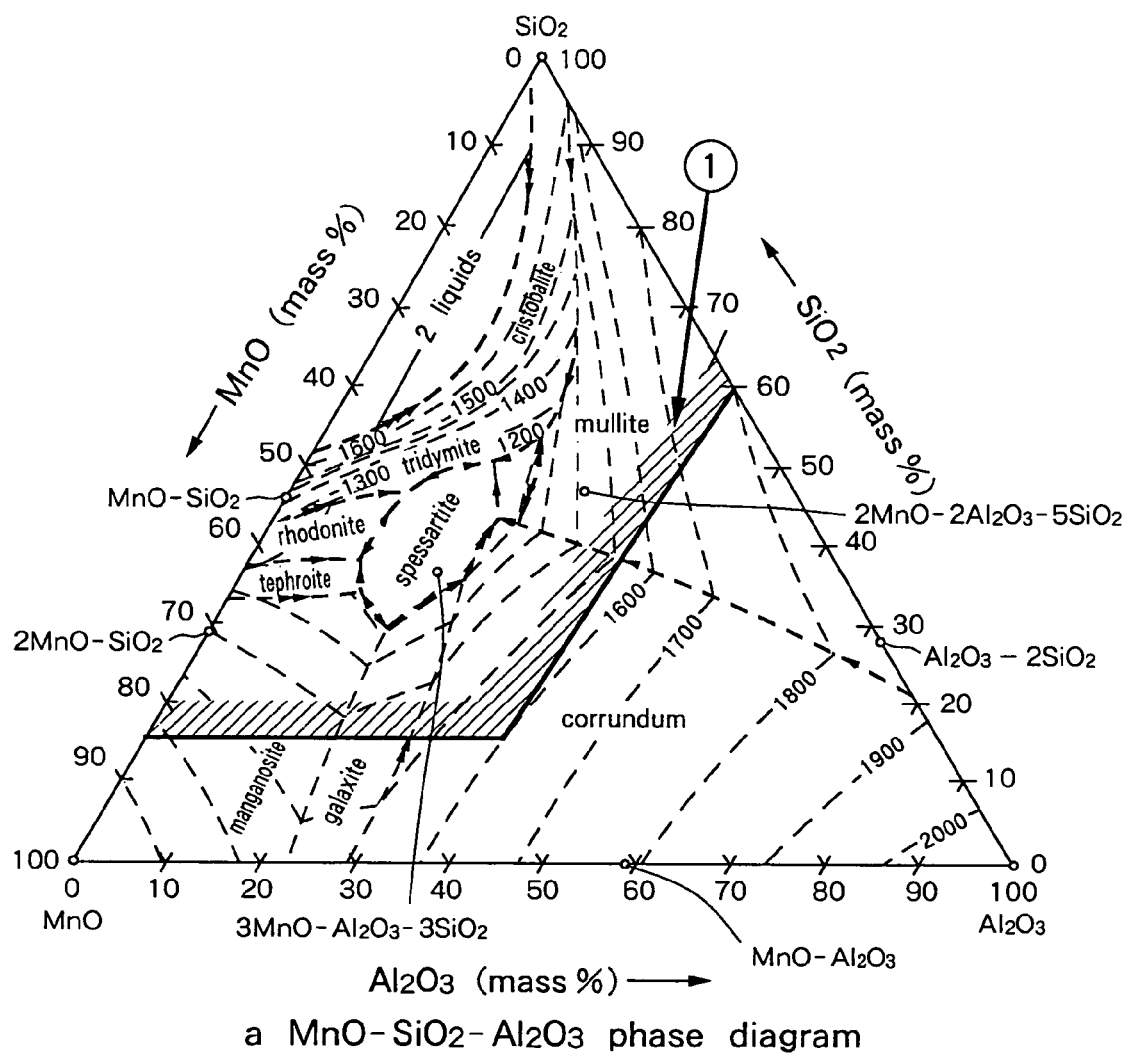
FIG. 3 is a $MnO-SiO_2-Al_2O_3$ phase diagram.

On the other hand, when molten steel is refined in presence of basic slag by addition of a Si alloy, whose Al content is controlled less than 1.0 mass %, as a strong deoxidizer in a vacuum or non-oxidizing atmosphere, $Cr_2O_3$ of the MnO—$Cr_2O_3$ inclusion in the molten steel is replaced by $SiO_2$ and $Al_2O_3$. The reaction product is MnO—$SiO_2$—$Al_2O_3$ inclusion containing 15 mass % or more of $SiO_2$ and less than 40 mass % of $Al_2O_3$. According to the MnO—$SiO_2$—$Al_2O_3$ phase diagram (shown in FIG. 3, reported by Snow, R. B., J. Amer. Ceram. Soc.26 (1943), p. 11), a liquidus temperature is held at a relatively lower level by controlling the composition of the inclusion in the range {1}. Such the inclusion is viscously deformed during hot-rolling, and divided to fine size and distributed in a steel matrix by cold-rolling. The fine-size inclusion does not act as a starting point to generate cracks during forming any more, so that a steel sheet can be formed to an objective shape without occurrence of cracking.

Al content is preferably kept at a ratio not more than 0.003 mass % for generation of soft MnO—$SiO_2$—$Al_2O_3$. Such the low level of Al content is realized by use of a Si alloy whose Al content is controlled not more than 1.0 mass %.

The other features of the present invention will be more apparent from the under-mentioned explanation on alloying elements, a deoxidizer and composition of inclusion.

C up to 0.04 mass %, N up to 0.035 mass %

C and N are elements, which strengthen a steel sheet by solution-hardening. However, excessive C and N contents cause increase of 0.2% yield strength and hardness. Increase of yield strength and hardness degrades formability of a steel sheet which is formed to an objective shape by press working, and causes occurrence of cracking during forming. In this sense, C and N contents are controlled not more than 0.04 mass % and 0.035 mass %, respectively.

Si: 0.1-1.0 mass %

Si is a component of a strong deoxidizer. Deoxidizing reaction well advances at Si content not less than 0.1 mass %. If Si content is less than 0.1 mass %, deoxidizing reaction is insufficient, so that hard MnO—$Cr_2O_3$ inclusion, which is generated before deoxidizing and refining, remains as such in a steel sheet. However, excessive Si content more than 1.0 mass % hardens a steel sheet and causes occurrence of cracking during drawing. Therefore, Si content is controlled in a range of 0.1-1.0 mass %.

A Si source useful as a strong deoxidizer is ferrosilicon, but industrially available ferrosilicon contains Al as an impurity. If molten steel is deoxidized with ferrosilicon containing Al at a ratio more than 1.0 mass %, galaxite inclusion, which causes occurrence of cracking during forming, is inevitably generated. Therefore, Al content of the deoxidizer shall be controlled not more than 1.0 mass %.

Al up to 0.003 mass %

Composition of inclusions is greatly changed in response to Al content of molten steel. If Al content exceeds 0.003 mass %, galaxite inclusion is generated in a steel sheet. Therefore, Al content shall be controlled less than 0.003 mass %.

Nonmetallic inclusion

When nonmetallic inclusion is converted to MnO—$SiO_2$—$Al_2O_3$ containing not less than 15 mass % of $SiO_2$ and not more than 40 mass % of $Al_2O_3$, it is divided to fine harmless size by hot-rolling and cold-rolling so as to decrease its susceptibility to cracking during forming. If the nonmetallic inclusion contains less than 15 mass % of $SiO_2$ or more than 40 mass % of $Al_2O_3$, it is changed to galaxite, which is hardly divided by hot- and cold-rolling. In this case, cracking easily occurs during forming a steel sheet to an objective shape. Therefore, the nonmetallic inclusion shall be converted to MnO—$SiO_2$—$Al_2O_3$ containing not less than 15 mass % of $SiO_2$ and not more than 40 mass % of $Al_2O_3$.

Mn up to 5.0 mass %

Mn is an alloying element, which makes a steel sheet softer as increase of Mn content. An effect of Mn on hardness of a steel sheet is saturated at 5.0 mass % Mn, and the steel sheet is not become softer any more by addition of Mn at a ratio above 5.0 mass %.

S up to 0.0060 mass %

Since hot-workability of a steel sheet is degraded as increase of S content, S content shall be controlled not more than 0.0060 mass %. In order to bestow the steel sheet with excellent hot-workability, S content is preferably restricted at a ratio not more than 0.0030 mass %. In the case where S content exceeds 0.0030 mass %, hot-workability of a steel sheet is improved by addition of B. Addition of B is also effective for alloying design with a high degree of freedom. However, excessive addition of B above 0.03 mass % rather degrades hot-workability. In this sense, an upper limit of B is determined at 0.03 mass %.

Ni: 5-9 mass %

Ni is an essential element for austenitic stainless steel, and Ni content not less than 5 mass % is necessary for maintenance of an austenitic phase. Ni is also effective for improvement of formability. However, Ni content shall be controlled not more than 9 mass %, since Ni is an expensive element. A stainless steel sheet is sufficiently softened even by addition of Ni at a ratio of 9 mass % or less.

Cr content shall be controlled not less than 15 mass % for assurance of corrosion resistance. Since excessive addition of Cr causes increase of hardness, an upper limit of Cr is determined at 20 mass %.

Cu: 1.0-5.0 mass %

Cu is an important element for softening and formability. An effect of Cu on softening and formability is noted at a ratio not less than 1.0 mass %. Addition of Cu more than 2 mass % enables reduction of Ni content down to 5 mass % in order to save consumption of expensive Ni. In this sense, Cu is added at a ratio of 1.0 mass % or more, but preferably 2.0 mass % or more. Such the effects of Cu are effectively realized by elimination of galaxite and $MnO$—$Cr_2O_3$ inclusions. However, excessive addition of Cu above 5.0 mass % unfavorably degrades hot-workability of a steel sheet.

During steel-making, molten steel is deoxidized and refined in presence of basic slag in a vacuum or non-oxidizing atmosphere by addition of a strong deoxidizer such as ferrosilicon whose Al content is controlled at a lower level. The basic slag has $SiO_2$ activity reduced by addition of CaO.

There are no restrictions on an addition ratio of CaO, but basicity $CaO/SiO_2$ of slag is preferably kept in a range of 1.4-3.0. Excessive addition of CaO rather impedes preparation of homogeneous slag. Other additives such as $CaF_2$ or $Al_2O_3$ may be added to homogenize the slag. Molten steel is optionally stirred by blowing an inert gas or the like during refining, in order to improve cleanliness of the molten steel. Conditioning slag composition is effective for cleaning the molten steel, but does not inhibit generation of galaxite inclusion by itself, unless the molten steel is deoxidized by a Si alloy in presence of basic slag.

Furthermore, a new austenitic stainless steel is preferably adjusted to a proper composition, according to alloying design which satisfies Conditions (1) and (2). That is, an austenitic stainless steel good of hot-workability having hardness not more than 130 HV is offered by controlling to a composition containing not more than 9 mass % of Ni and 1.0-5.0 mass % of Cu with a value $d \leq 0$ and a value $a > 0$.

$$d = 1.9Ni + 32C + 27N + 0.15(Mn + Cu) - 1.5Cr + 8.5 \leq 0 \quad (1)$$

$$a = Ni + 0.5Cr + 0.7(Mn + Cu) - 18 > 0 \quad (2)$$

EXAMPLE

Each austenitic stainless steel 500 kg having a composition shown in Table 1 was melted in an induction heating furnace, and refined under conditions shown in Tables 2 and 3. The refined steel was cast, hot-rolled, annealed at 1050° C., pickled with an acid and then cold-rolled to thickness of 0.3 mm. Inclusions of the steel sheet was varied in response to the refining conditions.

Each stainless steel sheet was subjected to a multi-stepped drawing test with a drawing ratio of 3, and occurrence of cracking in the drawn sample was researched in relation with the composition of inclusions.

Results are shown in Tables 2 and 3. Sample Nos. 1-6 are stainless steels refined according to the present invention. That is, molten steel was refined in a vacuum or non-oxidizing atmosphere, while adding ferrosilicon whose Al content was controlled not more than 1.0 mass % in presence of basic slag. Nonmetallic inclusion generated in any case was $MnO$—$SiO_2$—$Al_2O_3$ containing not less than 15 mass % of $SiO_2$ and less than 40 mass % of $Al_2O_3$. Stainless steels of Sample Nos. 1-6 were pressed to an objective shape without occurrence of cracking originated in the nonmetallic inclusion.

On the other hand, nonmetallic inclusion present in stainless steels of Sample Nos. 7-14 refined under conditions out of the present invention was galaxite or $MnO$—$Cr_2O_3$. When such the steel sheets were heavily drawn, cracks originated in nonmetallic inclusion were generated.

TABLE 1

COMPOSITIONS OF AUSTENITIC STAINLESS STEELS

| Sample No. | Alloying elements (mass %) | | | | | | | | | | Note |
|---|---|---|---|---|---|---|---|---|---|---|---|
| | C | Si | Mn | Ni | Cr | N | S | Cu | Al | O | |
| 1 | 0.013 | 0.33 | 2.25 | 7.15 | 16.85 | 0.014 | 0.0058 | 3.22 | 0.001 | 0.0048 | Inventive Examples |
| 2 | 0.034 | 0.42 | 1.95 | 6.01 | 18.35 | 0.009 | 0.0036 | 3.94 | 0.002 | 0.0041 | |
| 3 | 0.015 | 0.51 | 4.03 | 8.84 | 19.01 | 0.019 | 0.0048 | 2.21 | 0.003 | 0.0055 | |
| 4 | 0.014 | 0.31 | 1.70 | 8.04 | 17.05 | 0.012 | 0.0051 | 3.58 | 0.002 | 0.0061 | |
| 5 | 0.023 | 0.36 | 2.44 | 7.51 | 17.14 | 0.009 | 0.0010 | 2.54 | 0.003 | 0.0049 | |
| 6 | 0.071 | 0.22 | 1.89 | 7.56 | 18.58 | 0.014 | 0.0008 | 1.01 | 0.003 | 0.0068 | |
| 7 | 0.011 | 0.22 | 1.54 | 7.77 | 18.45 | 0.011 | <u>0.0065</u> | 3.02 | 0.003 | 0.0065 | Comparative Examples |
| 8 | 0.012 | 0.33 | 1.58 | 6.51 | 18.11 | 0.013 | 0.0025 | 4.43 | <u>0.004</u> | 0.0041 | |
| 9 | 0.031 | 0.35 | 2.34 | 7.56 | 16.05 | 0.014 | 0.0032 | 4.59 | <u>0.008</u> | 0.0077 | |
| 10 | 0.021 | 0.22 | 2.98 | 7.78 | <u>14.56</u> | 0.018 | 0.0015 | <u>5.12</u> | <u>0.007</u> | 0.0030 | |
| 11 | 0.015 | 0.58 | 2.66 | 8.66 | 15.69 | 0.020 | 0.0026 | 3.25 | 0.001 | 0.0098 | |
| 12 | 0.019 | 0.71 | 4.18 | 6.45 | 16.25 | 0.018 | 0.0015 | 3.66 | 0.001 | 0.0148 | |
| 13 | 0.017 | 0.38 | 1.36 | 5.65 | 16.05 | 0.014 | 0.0033 | 3.11 | 0.002 | 0.0177 | |
| 14 | 0.016 | 0.24 | 3.54 | 8.24 | 17.89 | 0.014 | 0.0015 | 2.56 | 0.003 | 0.0112 | |

The underlines mean conditions out of the present invention.

TABLE 2

EFFECTS OF REFINING CONDITIONS ON
FORMABILITY OF STAINLESS STEEL SHEETS (Inventive Examples)

| Example No. | Refining Conditions | | Slag A ratio of CaO/SiO$_2$ | Composition (mass %) Of Nonmetallic Inclusions | | | | | Results Of A Drawing Test |
|---|---|---|---|---|---|---|---|---|---|
| | Atmosphere | Al content | | MnO | SiO$_2$ | Al$_2$O$_3$ | CaO | MgO | |
| 1 | Vacuum | 0.1 | Basic 1.4 | 63.5 | 34.0 | 2.5 | | | ○ |
| 2 | Vacuum | 0.001 | Basic 2.2 | 64.2 | 35.7 | 5.6 | | | ○ |
| 3 | Ar | 0.001 | Basic 3.0 | 60.5 | 19.2 | 15.4 | 4.9 | | ○ |
| 4 | Ar | 0.8 | Basic 1.4 | 54.8 | 29.5 | 18.4 | | | ○ |
| 5 | N$_2$ | 0.2 | Basic 2.2 | 60.4 | 29.8 | 5.9 | | | ○ |
| 6 | N$_2$ | 0.5 | Basic 2.5 | 59.4 | 30.7 | 5.8 | 2.5 | 1.6 | ○ |

Al content means a ratio of Al in a Si alloy as a strong-deoxidizer.
○ represents absence of cracks in a drawn stainless steel sheet.

TABLE 3

EFFECTS OF REFINING CONDITIONS ON
FORMABILITY OF STAINLESS STEEL SHEETS (Comparative Examples)

| Example No. | Refining Conditions | | Slag A Ratio Of CaO/SiO$_2$ | Compositions (mass %) of Nonmetallic Inclusions | | | | Formability | Origination Of Cracking |
|---|---|---|---|---|---|---|---|---|---|
| | Atmosphere | Al content | | MnO | SiO$_2$ | Al$_2$O$_3$ | Cr$_2$O$_3$ | | |
| 7 | Vacuum | <u>1.7</u> | basic 1.4 | 53.7 | <u>0.9</u> | <u>45.4</u> | | x | MnO—Al$_2$O$_3$ inclusion |
| 8 | Ar | 0.5 | basic 1.4 | 60.1 | <u>0.4</u> | 39.5 | | x | MnO—Al$_2$O$_3$ inclusion |
| 9 | N$_2$ | <u>1.2</u> | basic 1.8 | 49.3 | ND | <u>50.7</u> | | x | MnO—Al$_2$O$_3$ inclusion |
| 10 | Vacuum | <u>2.1</u> | basic 2.0 | 51.9 | ND | <u>48.1</u> | | x | MnO—Al$_2$O$_3$ inclusion |
| 11 | Vacuum | 1.0 | <u>Slag-less</u> | 52.0 | ND | ND | 48.0 | x | MnO—Cr$_2$O$_3$ inclusion |
| 12 | Ar | 0.5 | <u>acidic</u> <u>0.4</u> | 41.4 | ND | ND | 58.6 | x | MnO—Cr$_2$O$_3$ inclusion |
| 13 | Ar | <u>No</u> | basic 2.5 | 51.4 | ND | ND | 48.6 | x | MnO—Cr$_2$O$_3$ inclusion |
| 14 | N$_2$ | 0.8 | <u>Slag-less</u> | 57.1 | ND | ND | 42.9 | x | MnO—Cr$_2$O$_3$ inclusion |

Al content means a ratio of Al in a Si alloy as a strong deoxidizer.
The underlines represent conditions out of the present invention.
ND: absence of the respective component
x: occurrence of cracks during forming According to the present invention as above-mentioned, austenitic stainless steel, which contains Si and Al at controlled ratios, is refined and deoxidized with a Si alloy whose Al content is restricted under a certain level, so as to make up a structure wherein nonmetallic inclusion is minutely dispersed as MnO—SiO$_2$—Al$_2$O$_3$ inclusion in a steel sheet. Since the austenitic stainless steel sheet can be formed to an objective shape without occurrence of cracking due to a decrease in its susceptibility to cracking, it is useful as steel members or parts in various industrial fields.

The invention claimed is:

1. A method of manufacturing austenitic stainless steel, which comprises the steps of:
preparing a molten steel having the composition comprising approximately 0-0.04 mass % C, approximately 0.1-1.0 mass % Si, approximately 0-5.0 mass % Mn, approximately 0-0.0060 mass % S, approximately 0-0.003 mass % Al, approximately 5-9 mass % Ni, approximately 15-20 mass % Cr, approximately 0-0.035 mass % N, approximately 1.0-5.0 mass % Cu and the balance being Fe except inevitable impurities with provisions of $d=1.9Ni+32C+27N+0.15(Mn+Cu)-1.5Cr+8.5 \leq 0$ and $a=Ni+0.5Cr+0.7(Mn+Cu)-18>0;$ covering said molten steel with basic slag in a vacuum or non-oxidizing atmosphere; and deoxidizing said molten steel by addition of a Si alloy whose Al content is controlled less than approximately 1.0 mass % so as to disperse MnO—SiO$_2$—Al$_2$O$_3$ type nonmetallic inclusion in a solidified steel matrix, wherein the nonmetallic inclusion contains 15 mass % or more SiO$_2$ and 40 mass % or less Al$_2$O$_3$.

2. The method of manufacturing austenitic stainless steel according to claim 1, further comprising the step of adding boron up to a max of 0.03 mass %, if the sulfur content is greater than 0.0030 mass %.

3. The method of manufacturing austenitic stainless steel according to claim 1, further comprising the step of keeping the basicity of the slag in a range of 1.4-3.0.

* * * * *